W. A. PRICE.
ELECTRICAL MACHINE.
APPLICATION FILED JAN. 31, 1911.
1,089,077.
Patented Mar. 3, 1914.
2 SHEETS—SHEET 2.
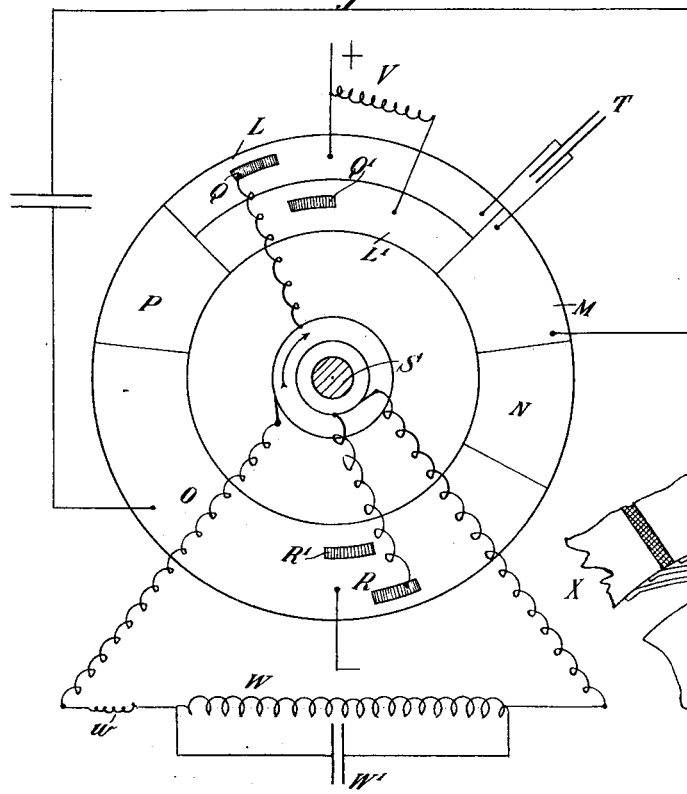
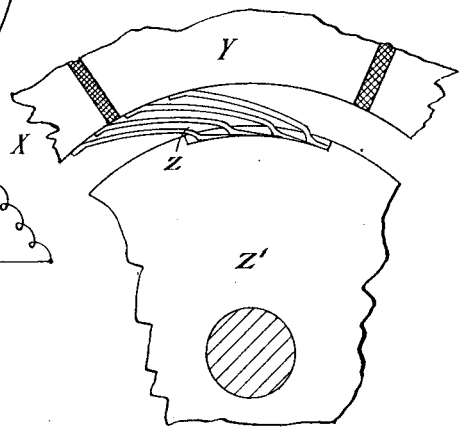
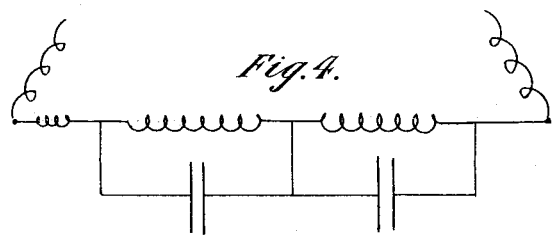
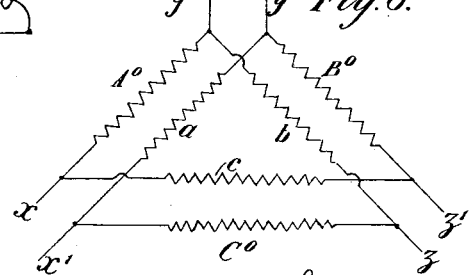
Witnesses:
M. F. Keating
J. J. Hennebery
Inventor:
William Arthur Price
By his Attorney,
Charles J. Kintner.

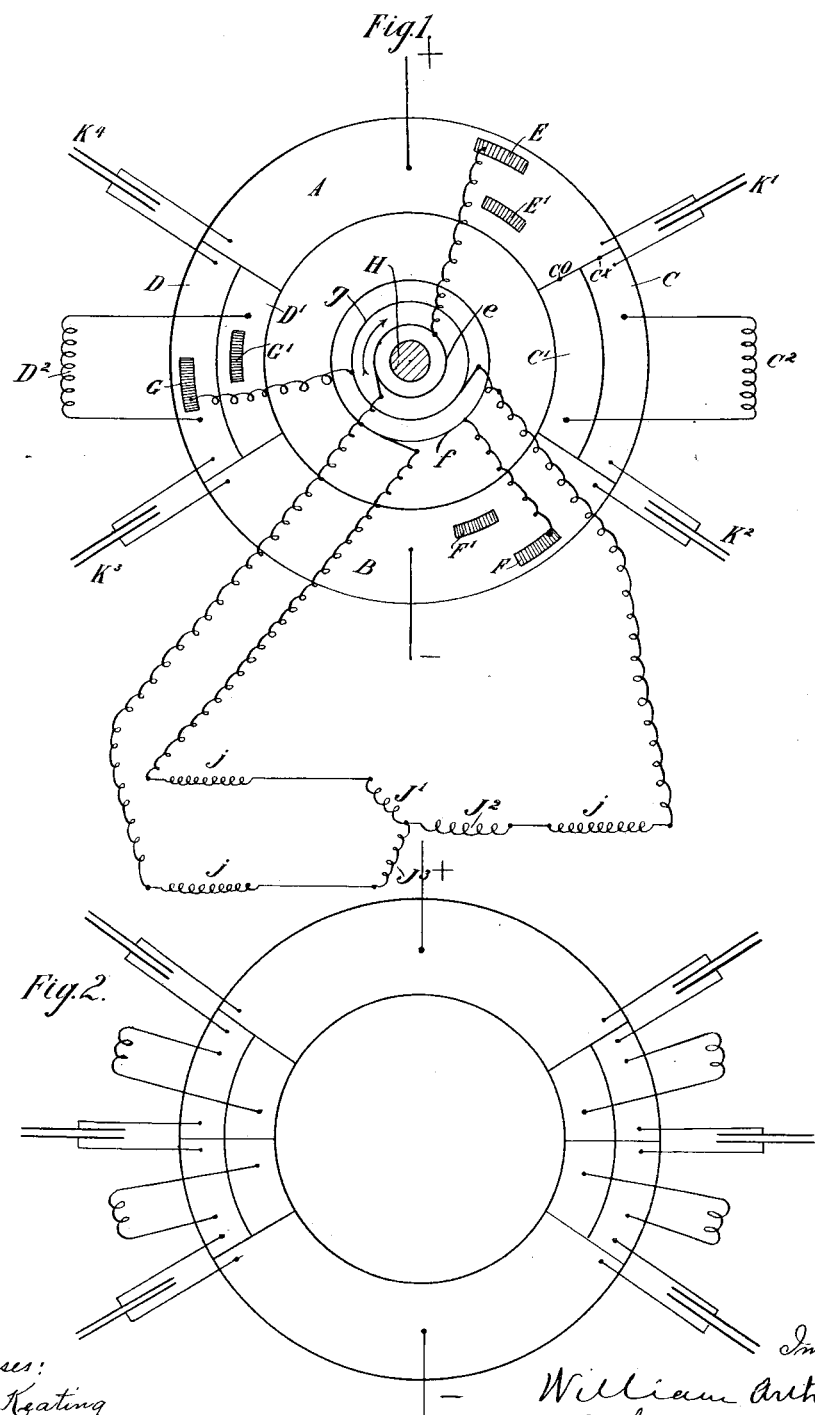

UNITED STATES PATENT OFFICE.

WILLIAM ARTHUR PRICE, OF TEDDINGTON, ENGLAND.

ELECTRICAL MACHINE.

1,089,077. Specification of Letters Patent. Patented Mar. 3, 1914.

Application filed January 31, 1911. Serial No. 605,809.

*To all whom it may concern:*

Be it known that I, WILLIAM ARTHUR PRICE, a subject of the King of Great Britain, residing at 38 Gloucester road, Teddington, in the county of Middlesex, England, have invented certain new and useful Improvements Relating to Electrical Machines, of which the following is a specification.

This invention relates to electrical machines, the chief object being to enable the rapid interruptions of the electric current or the rapid changes of the electrical connections incidental to the working of electric motors to be accomplished in an improved manner, and in particular to enable motors of the induction type to be operated by direct current.

The usual method of driving alternating current motors from a direct current source is to employ a rotary transformer to effect the necessary conversion in the character of the current prior to its consumption by the motor. It has also been proposed to employ specially constructed commutators for effecting this conversion. The conversion in the character of the current by means of commutating devices possesses advantages over conversion by transformers so long as sparking at the brushes of the commutator can be avoided.

One useful application of the invention is the driving of three-phase induction motors by means of a direct current supply. Assuming for example that the field windings of a squirrel cage motor to be represented by three lines radiating from a common point and at one hundred and twenty degrees apart (star connection) or to be represented by the three sides of an equilateral triangle (mesh connection), then it will be understood that a rotary field, such as is required to cause the armature or "rotor" to rotate, will be produced if the positive and negative poles of a direct current supply are connected to the ends of the three radial lines or the three corners of the triangle in proper sequence.

The use of condensers, including those of the electrolytic type, for reducing sparking is well known and a particular use of electrolytic condensers, namely, their employment in conjunction with inductive and non-inductive shunt or auxiliary circuits, is described in my British Patent No. 14,380 of 1910. According to the present invention a commutating device is used to effect the conversion in the character of the current, in combination with electrolytic condensers and inductive and non-inductive auxiliary circuits, on the principle set forth in the above-named British Patent. The aforesaid commutator may be a small apparatus independent of the main motor as regards its working, and the speed at which it is driven will determine the speed of rotation of the motor armature. A small motor may, for instance, be employed to drive the commutator.

From the foregoing description it will be seen that a motor having no commutator or brushes and no commutating field windings can be operated by direct current, and that the speed at which its armature rotates can be controlled by controlling the speed of a small independent motor.

In order that the invention may be clearly understood and readily carried into effect the same will now be described more fully with reference to the accompanying drawings, in which:

Figure 1 represents one arrangement of apparatus and electrical connections for deriving three-phase or plain alternating current from a direct current supply in accordance with the invention. Fig. 2 represents a modified form of the commutator shown in Fig. 1. Fig. 3 represents a modified arrangement for producing plain alternating or two phase current. Fig. 4 is a modification of part of Fig. 3. Fig. 5 is a detail hereinafter described. Fig. 6 represents connections for the series-paralleling of a motor or motors, as hereinafter described.

Referring first to Fig. 1, the commutator comprises two broad oppositely situated conducting segments A and B of one hundred and twenty degrees in extent, and two pairs of narrow segments C C' and D D' respectively. The two segments A and B are connected to the positive and negative mains of a direct current supply, the segments C C' are connected through an inductance $C^2$, the segments D D' through an inductance $D^2$, and the segments A and C, C and B, B and D, and D and A by the electrolytic condensers K', K², K³ and K⁴ respectively.

E E', F F', and G G' are three pairs of brushes situated at one hundred and twenty degrees apart and adapted to slide over the above mentioned conducting segments by rotation about the common axis H. The brushes E F and G are connected through the slip rings $e$ $f$ and $g$ respectively to the three ends of the star connected windings J' J² J³ of a three-phase induction motor. The brushes E', F' and G' are situated in advance of the brushes E F and G and serve merely to short-circuit certain segments as will now be explained.

With the parts in the position shown in Fig. 1, the current is flowing from the positive main to the segment A and thence by way of the brush E, and slip ring $e$ to the windings J² J' of the motor, from which it passes by way of the slip ring $f$ brush F and segment B, to the negative main. At this stage it will be understood that the voltage of the mains is being shared by the condensers K', K² on the one hand and the condensers K³ K⁴ on the other hand. As the brushes advance in a clockwise direction the brush E eventually moves off the segment A, and thereby breaks the circuit between these parts. I effect this breaking of the circuit in a sparkless manner by the principle set forth in the prior application No. 603,799. This is effected as follows:—

The brush E' first bridges the contacts A and C' and thereby enables the condenser K' to discharge by way of the inductance C² and brush E'. While the brush E' is still bridging the contacts A and C' the brush E bridges the contacts A and C. At this stage therefore there are two points or segments, namely A and C, connected by a condenser K' and by two shunt paths, one path being inductive, namely that through the inductance C², and the other non-inductive, namely that constituted by the brush E itself. As the brushes advance, the circuit is broken sparklessly or nearly so because the inductive circuit is opened first by the passage of the brush E' off the segment A, and the non-inductive circuit next, by the passage of the brush E off the said segment A. While the condenser K' was being short-circuited by the brush E, the condenser K² was sustaining the full voltage of the mains, but immediately this brush passed off the segment A, the condenser K' was of course charged again.

The above described series of operations occurs during the breaking of the circuit at each pair of brushes. It only remains to observe the conditions existing during the remaking of the circuit. Consider for example the passage of the brushes G G' off the segments D D' and onto the segment A. It is desired to establish connection sparklessly between the segment A and the brush G or segment D, these latter being electrically one and the same for the time being since they are in electrical contact. The brush G' first bridges the segments D' and A, and thereby closes the circuit between the segment A and brush G by way of the inductance D², and the brush G then constitutes a non-inductive circuit in shunt upon the condenser K⁴. The effect of closing the circuit through the inductance D² first is that the oscillatory discharge that would surge in and out of the condenser if the main circuit were closed directly through a non-inductive circuit is avoided. The brush G' and afterward the brush G pass off the segments D' and D respectively, and as soon as the brush G passes off the segment D the condenser K⁴ becomes re-charged.

From the foregoing description it will be understood that the continuous rotation of the brushes will produce a rotating magnetic field in the windings J' J² J³ of the induction motor, and that every pair of points between which a circuit has to be broken or established is connected by an electrolytic condenser, the breaking of the circuit taking place in a non-inductive shunt circuit and the establishment taking place in an inductive shunt circuit.

When the rotor of the induction motor is running at or nearly at the speed of its rotating field, which latter is determined by the speed of the commutator brushes, explosive sparks are liable to occur at the commutator; inductive resistances are inserted, as shown at $j$ $j$ $j$, to prevent this.

It will be observed that the motor itself when operated as above described does not require any commutator proper and that the speed at which it is driven at any moment is determined merely by the speed at which the rotary brushes of the commutator are driven. By reducing the speed of these brushes the motor will correspondingly slow down and the kinetic energy of the motor may be such that the motor temporarily acts regeneratively, electrical energy being returned to the source of the electric current.

It will be understood without further illustration or description that if, instead of using three pairs of brushes, as shown in Fig. 1, two pairs of brushes diametrically situated were employed with corresponding alterations in electrical connections, a plain alternating current could be obtained.

When electrolytic condensers are subjected to a voltage in excess of a certain critical voltage, which is about two hundred and forty five volts for aluminium plates in a twenty per cent. solution of Rochelle salt, a considerable current passes through them, which heats the condensers. Accordingly these condensers must not be subjected continuously or frequently to a voltage exceeding two hundred and forty five volts, though no considerable rise in temperature takes place if the occurrence is not too frequent, nor continued too long. Two condensers are seen in Fig. 1 to be connected in series with one another between the positive and negative terminals on each half of the commutator, namely K' K² on one side, and K³ K⁴ on the other side. As however the brushes in succession make contact between the several pairs of segments, each condenser is momentarily short circuited, and the full voltage of the supply is thrown for an instant on the other one of the pair. The arrangement shown in Fig. 1 is therefore suitable only for voltages not exceeding two hundred and forty-five volts. A commutator constructed as shown in Fig. 2 is suitable for voltages of double that amount, as at no time are less than two condensers in series connected across the broad segments to which the supply mains are connected. Higher voltages can be provided for similarly.

To avoid the use of several electrolytic condensers of large capacity as is necessary if the remaking of the main circuit is effected in the same way as the breaking (as happens in Fig. 1 for example) I may adopt a modified procedure which I will now describe with reference to the supply of current to the field windings of a single phase alternating current motor. In this modified procedure I employ the usual electrolytic condenser and auxiliary inductive and non-inductive circuits for the purpose of breaking the circuit between the main current supply and the field windings, but for the remaking of this circuit I employ two or more smaller condensers and by their aid entirely disconnect the said windings from the main circuit and reconnect them, with their ends reversed, to the main circuit. I will now describe with reference to Fig. 3 one form of commutator and connections for accomplishing this result. The commutator comprises the commutator segments L, L', M, N, O, and P; Q Q' and R, R' are two pairs of diametrically situated brushes which bear upon the segments of the commutator and rotate about the axis S. The connections of the various segments to the positive and negative mains of a direct current supply, to the main electrolytic condenser T and smaller electrolytic condenser U, and to the inductance V, also the connections of the brushes Q and R to the ends of the motor field winding W, will be apparent by inspection of the drawing. The winding W is shunted by a small electrolytic condenser W'. With the parts in the position shown, the winding W is being supplied with current flowing from left to right and the condenser W' is charged. As the brushes Q Q', proceeding in a clockwise direction, pass onto the segment M, the condenser T is first discharged through the inductance V by means of the brush Q' and then short circuited through a non-inductive circuit by means of the brush Q; these operations will be understood from those already described with reference to Fig. 1. At the moment when the brush Q passes completely off the segment M, the condensers U and W' serve to prevent sparking. When the brushes R and R' have passed completely onto the segment N, the field winding W is completely disconnected from the supply. As the brushes proceed on their way, the passage of the brush Q off the segment N and onto the segment O connects to the negative main the end of the field winding that was previously connected to the positive main, and soon afterward the passage of the brushes R R' off the segment P and onto the segments L L' reëstablishes the main circuit; this completion of the main circuit occurs sparklessly, owing to the completion taking place first through the inductance V by the bridging action of the brush R', followed by the short circuiting of the said inductance by the bridging action of the brush R.

Since the above described re-making of the circuit has caused a current to pass through the winding W from right to left, it will be understood that the rapid and continuous rotation of the brushes will cause an alternating current to flow in the said winding. It may be desirable to insert an inductive resistance $w$ in series with the winding W.

The arrangement shown in Fig. 3 is suitable for voltages up to two hundred and forty-five volts. If it is desired to use double that voltage the winding W may be divided up into two parts each of which is shunted by an electrolytic condenser, as shown in Fig. 4; or two condensers in series may be used instead of a single condenser. Higher voltages may be provided for similarly.

From the constructional aspect, certain conditions should be observed to insure sparkless operation at the commutator. In the first place, the brushes should have a firm and constant bearing on the commutator segments. This applies especially to the moment when any one of the brushes is bridging the insulation between two segments. To insure the necessary firmness and constancy of contact, I find it convenient to use a commutator of hollow cylindrical form and to construct the brushes of thin metal leaves mounted on an insulating disk or drum adapted to rotate within the cylinder.

The brushes are then held firmly against the commutator segments under the influence of centrifugal force. Such a construction is shown in Fig. 5 where X and Y represent two segments of cast iron and Z is a brush carried on a disk Z'. A further condition to observe is due to the fact that although the action of the advanced brushes largely reduces the sparking produced by the discharge of the condensers, it may not always completely prevent its occurrence. It is therefore desirable that such sparking, if it occurs, should not be close to the points where the following brushes immediately afterward break the circuits. In Fig. 1, for example, a small spark may be produced at the point $c^\circ$ where the brush E' first bridges the segments A and C'; hence this point $c^\circ$ should not be close to the point $c^x$ where the brush E leaves the segment A, since otherwise the small spark at $c^\circ$ might cause a large spark at $c^x$. This precaution should be observed wherever similar conditions prevail. In the drawings the condition is complied with by causing the brushes E F and G to travel over a different path from that of the brushes E' F' and G'. Again the circuit that joins a condenser between any pair of commutator segments, should be as nearly non-inductive as possible; that is to say the magnetic field established by the electric charges as they pass into and out of the condenser plates should be as small as possible.

By suitably constructing the commutator and by arranging the windings in mesh connection in a special manner it is possible to series-parallel two motors, or even to series-parallel a single motor. I will describe one system of connections for this purpose by reference to Fig. 6. Suppose that $A^\circ$, $B^\circ$ and $C^\circ$ are three motor-field windings situated parallel to the sides of an equilateral triangle but unconnected with each other, and suppose $a$ $b$ and $c$ are three windings situated alongside the windings $A^\circ$, $B^\circ$ and $C^\circ$, and belonging to another motor. Let these six windings be connected in series as shown, that is to say in the following order:—$A^\circ$, $b$, $C^\circ$, $a$, $B^\circ$, $c$. Let the junction of $A^\circ$ and $c$ and of $a$ with $C^\circ$ be termed $x$ and $x'$ respectively; the junction of $a$ with $B^\circ$ and of $A^\circ$ with $b$ be termed $y$ and $y'$ respectively; and the junction of $b$ with $C^\circ$, and of $c$ with $B^\circ$ be termed $z$ and $z'$ respectively. The field windings of the two motors may be said to be connected in series and the motors may be operated by connecting the poles of a direct current supply to the points $x$, $y$ and $z$ in proper succession by means of a distributer adapted to operate in the manner hereinbefore described. By connecting the points $x$ and $x'$ together, the points $y$ and $y'$ and the points $z$ and $z'$, the motors can be said to be connected in parallel and will operate with the full voltage of the supply on each motor. These connections to the + and − poles of a direct current supply are made in the following succession of 12 periods:—

| Period. | Point $x$. | Point $y$. | Point $z$. |
|---|---|---|---|
| 1 | + | − | Disconnected. |
| 2 | + | − | − |
| 3 | + | Disconnected. | − |
| 4 | + | + | − |
| 5 | Disconnected. | + | − |
| 6 | − | + | − |
| 7 | − | + | Disconnected. |
| 8 | − | + | + |
| 9 | − | Disconnected. | + |
| 10 | − | − | + |
| 11 | Disconnected. | − | + |
| 12 | + | − | + |
| 13 as 1 | + | − | Disconnected. |

Consider any winding, for example $C^\circ$. The E. M. F. in $C^\circ$ is from $x^1$ to $z$ during periods 2, 3, 4, 5 and 6, and from $z$ to $x^1$ during periods 8, 9, 10, 11 and 12, so that the E. M. F. is reversed twice in each complete series of connections, and therefore gives rise to an alternating current. This holds whether the windings are connected in series or in parallel, with the difference that, when they are in series, the currents in the windings $a$, $C^\circ$ (in series between the points $y$ and $z$) are the same; when they are in parallel, the currents in the windings $A^\circ$, $a$, (in parallel between the points $x$ and $y$) are the same at each instant.

It will be understood that if the six windings above mentioned are considered as belonging to a single motor, the above described changes in connections result in the series parallel control of a single motor.

The above described series-parallel control of a motor or motors is particularly useful in the working of electric trams or trains, since it enables motors of the induction type to be employed with direct current, and a variety of speeds to be easily obtained. It will be observed that if the commutator, through which the source of direct current is connected to the motor or motors, is brought to rest so that the connections become stationary, the motor armature or armatures is or are held stationary.

What I claim and desire to secure by Letters Patent of the United States is:—

1. In the conversion of direct current into alternating current, the combination with the leads from a direct current supply, the leads to an alternating current consumer, and an interposed commutator comprising conducting segments and brushes movable relatively thereto, of an electrolytic condenser permanently connected across commutator segments in passing from one to the other of which the brushes break the circuit between the aforesaid leads, means for breaking an inductive circuit in shunt with respect to the condenser, and means for breaking a non-inductive circuit in shunt with respect to the condenser, the inductive circuit being broken before the non-inductive circuit.

2. In the conversion of direct current into alternating current, the combination with the leads from a direct current supply, the leads to an alternating current consumer, and an interposed commutator comprising conducting segments and brushes movable relatively thereto, of an electrolytic condenser permanently connected across commutator segments in passing from one to the other of which the brushes break the circuit between the aforesaid leads, another electrolytic condenser permanently connected across commutator segments in passing from one to the other of which the brushes remake the circuit between the aforesaid leads, means for making and breaking an inductive circuit in shunt with respect to each condenser, and means for making and breaking a non-inductive circuit in shunt with respect to each condenser, the inductive circuit being broken before the non-inductive circuit is broken and made before the non-inductive circuit is made.

3. In the conversion of direct current into alternating current, the combination with the leads of a direct current supply, the leads to an alternating current consumer, and an interposed commutator, comprising segments to which the leads of the direct current supply are connected, segments interposed between the aforesaid segments but unconnected to any of the aforesaid leads, and brushes connected to the leads of the alternating current consumer and movable with respect to all the commutator segments, of electrolytic condensers permanently connecting the first mentioned segments with the interposed segments, means for making and breaking an inductive circuit in shunt with respect to each condenser, and means for making and breaking a non-inductive circuit in shunt with respect to each condenser the inductive circuit being broken before the non-inductive circuit is broken, and made before the non-inductive circuit is made.

4. In the conversion of direct current into alternating current, the combination with the leads of a direct current supply, the leads to an alternating circuit consumer, and an interposed commutator, comprising segments to which the leads of the direct current supply are connected, and segments in pairs interposed between the aforesaid segments but unconnected to any of the aforesaid leads of electrolytic condensers permanently connecting the first mentioned segments with one of each of the adjacent pairs of interposed segments, inductances connecting together the segments of each of the aforesaid pairs of segments, brushes connected to the leads of the alternating current consumer and movable with respect to all the aforesaid segments, the said brushes being so situated relatively to the segments that they intermittently serve as a non-inductive shunt path across the condensers, and auxiliary brushes slightly in advance of the first mentioned brushes for intermittently completing shunt paths across the condensers through the inductances.

In testimony whereof I affix my signature in presence of two witnesses.

WILLIAM ARTHUR PRICE.

Witnesses:
WILLIAM OWEN,
W. H. WAKE.

Copies of this patent may be obtained for five cents each, by addressing the "Commissioner of Patents, Washington, D. C."